G. SHELTON.

Plows.

No. 5,530. Reissued August 12, 1873.

WITNESSES.

P. Hamay

D. S. Stuart

INVENTOR.

Gillum Shelton by A. McCallum

Atty.

AM. PHOTO-LITHOGRAPHIC CO. N.Y. (OSBORNE'S PROCESS.)

UNITED STATES PATENT OFFICE.

GILLUM SHELTON, OF NORMAL, ILLINOIS.

IMPROVEMENT IN PLOWS.

Specification forming part of Letters Patent No. 127,650, dated June 4, 1872; reissue No. 5,530, dated August 12, 1873; application filed July 7, 1873.

*To all whom it may concern:*

Be it known that I, GILLUM SHELTON, of Normal, county of McLean and State of Illinois, have invented certain Improvements in Plows, of which the following is a specification:

The object of my invention is to produce a plow which will not choke in plowing land carrying a heavy growth of grass, stubble, or weeds; and the invention consists in constructing the standard or bar which connects the mold-board and land-side to the beam with a lateral flange down each side of its front edge, thereby giving to said standard a broad front above the mold-board, which is rounded and polished so as to present the most favorable surface for the discharge of the weeds or other trash which tend to choke the plow in many places or kinds of land. In addition to the above, the upper end of the standard is so constructed that it can be securely attached to the beam, even allowing the standard to be made several inches longer than usual, and by the greater elevation of the beam further assisting in the prevention of the plow from choking, all as hereinafter fully described.

Figure 1:
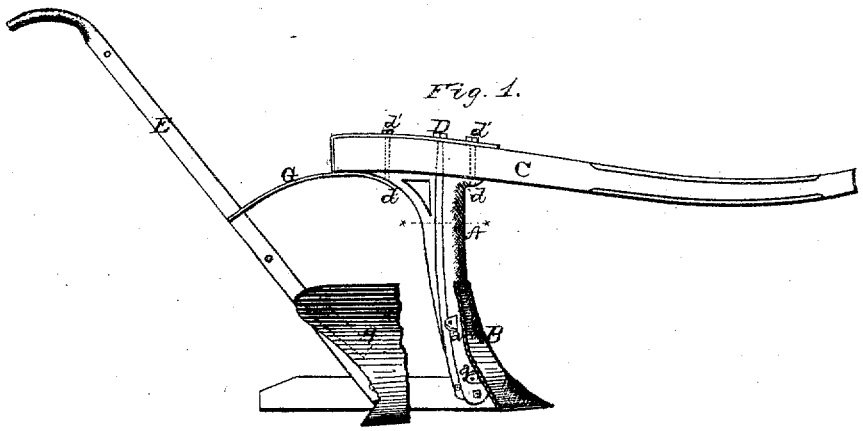
Figure 2:
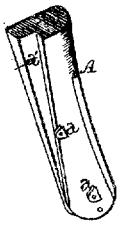
Figure 3:
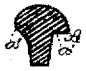

In the accompanying drawings, Figure 1 is a side view of a plow, showing my improvements on the same, a part of the mold-board being broken off to show the lower end of the standard. Fig. 2 is an elevation of the lower portion of the standard, and Fig. 3 is a cross-section of the standard on the line *x x* of Fig. 1.

Referring to the parts by letters, letter A represents the plow-standard, having the usual lugs *a a* on one side at its lower end, for the attachment of the mold-board B. C is the plow-beam, to which the standard A is attached. This standard A, so far as its attachment to the mold-board and land-side is concerned, is constructed substantially in the same manner as those now generally in use; but its upper portion, above the mold-board, it will be observed, has a lateral flange, *a′ a′*, extending from each side of its front edge, forming a broad front surface, which is rounded off and polished, so as to present no sharp edges, angles, or rough surface to hold grass, stubble, corn-stalks, weeds, or other trash. It is also made some inches longer above the mold-board than the usual standard, and has its upper end so constructed that it may be held securely to the beam against the greater strain at the connection by said elongation. Its upper end carries near its central part a projecting screw-bolt, D, and forward and rearward projecting arms *d d*. The arms *d d* are pierced with holes, through which screw-bolts *d′ d′* may pass, and extend upward through the plow-beam C. The screw-bolt D may be a projecting part of the standard A, or it may be the projecting end of a wrought-iron bar which is carried in a suitable groove longitudinally in the side of the standard A, especially when the standard itself is of cast-iron.

The plow-beam is constructed in the usual manner, or it may be cut off, as shown in the drawings, and then attached to the handle E by means of an iron bar, G, the front end of which is bifurcated, and receives the rear end of the beam C, and the rear of which is attached to the handle E, the bifurcated end of the bar G receiving the bolts D and *d″ d″*, as plainly shown at Fig. 1.

It will be evident to those familiar with the use of plows that the broad rounded and polished front edge of the standard, together with the increased height of the beam, will prevent the plow from choking even in the most trashy land, and that the attachment to the beam is such as to make it secure against increased strain arising from increased length of the standard.

I claim—

In combination with the beam C and mold-board B, the elongated standard A, having a broad rounded and polished front edge, a seat and lugs, *a a*, for the attachment of the mold-board, and its upper end having two arms, *d d*, and a bolt or bar, D, substantially as and for the purpose specified.

GILLUM SHELTON.

Witnesses:

AUSTIN WASHBURN,
A. C. COWLES.